United States Patent
Shirley et al.

(10) Patent No.: US 11,345,842 B2
(45) Date of Patent: May 31, 2022

(54) HYDROCARBON WELLS INCLUDING CROSSLINKED POLYMER GRANULES AS LOST CIRCULATION MATERIAL AND METHODS OF DRILLING THE HYDROCARBON WELLS

(71) Applicant: ExxonMobil Upstream Research Company, Spring, TX (US)

(72) Inventors: Robert M. Shirley, The Woodlands, TX (US); Pavlin B. Entchev, Spring, TX (US); Alan A. Galuska, Huffman, TX (US); William Handy, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/938,442

(22) Filed: Jul. 24, 2020

(65) Prior Publication Data
US 2021/0047551 A1   Feb. 18, 2021

Related U.S. Application Data

(60) Provisional application No. 62/951,746, filed on Dec. 20, 2019, provisional application No. 62/944,106, (Continued)

(51) Int. Cl.
*E21B 43/25* (2006.01)
*C09K 8/035* (2006.01)

(52) U.S. Cl.
CPC ............ *C09K 8/035* (2013.01); *E21B 43/255* (2013.01)

(58) Field of Classification Search
CPC ......... C09K 8/035; C09K 8/80; E21B 43/255; E21B 43/267; E21B 47/11; E21B 43/11; E32B 43/14
See application file for complete search history.

(56) References Cited

U.S. PATENT DOCUMENTS 6,902,002 B1   6/2005 Chatterji et al.
2003/0168258 A1*   9/2003 Koederitz ............... E21B 21/08
175/38

(Continued)

FOREIGN PATENT DOCUMENTS

GB   2359316 A   8/2001

OTHER PUBLICATIONS

Gheysari, DJ, The effect of high-energy electron beam on mechanical and thermal properties of LDPE and HDPE, European Polymer Journal, 2001, pp. 295-302, vol. 37.

(Continued)

*Primary Examiner* — Silvana C Runyan
(74) *Attorney, Agent, or Firm* — Leandro Arecederra, III

(57) ABSTRACT

Hydrocarbon wells including crosslinked polymer granules as lost circulation material and methods of drilling the hydrocarbon wells. The hydrocarbon wells include a wellbore that extends within a subsurface region, a drilling rig, a drilling mud supply system, a lost circulation detection structure, and a lost circulation material supply system that includes a lost circulation material. The lost circulation material includes a plurality of crosslinked polymer granules, and a characteristic dimension of each crosslinked polymer granule is at least 20 micrometers and at most 1 millimeter. Each crosslinked polymer granule contains a highly crosslinked polymeric material that includes a plurality of polyethylene polymer chains. The methods include rotating a drill string to extend a length of a wellbore and, during the rotating, flowing a drilling mud stream. The methods also include detecting a lost circulation event and, responsive to the detecting, providing a lost circulation material to the wellbore.

26 Claims, 2 Drawing Sheets

Related U.S. Application Data filed on Dec. 5, 2019, provisional application No. 62/890,186, filed on Aug. 22, 2019, provisional application No. 62/888,214, filed on Aug. 16, 2019.

(56) References Cited

U.S. PATENT DOCUMENTS

| | | |
|---|---|---|
| 2008/0113879 A1 | 5/2008 | Way et al. |
| 2011/0220350 A1 | 9/2011 | Daccord et al. |
| 2012/0108472 A1 | 5/2012 | Wu |
| 2016/0177162 A1* | 6/2016 | Nguyen ............ C09K 8/602 166/300 |
| 2016/0244654 A1* | 8/2016 | Way ............ C09K 8/035 |
| 2017/0096597 A1* | 4/2017 | Hu ............ C09K 8/82 |
| 2018/0044574 A1 | 2/2018 | Lopez |
| 2018/0334867 A1 | 11/2018 | Reddy |
| 2018/0363414 A1* | 12/2018 | Bogaerts ............ E21B 33/14 |

OTHER PUBLICATIONS

Chodak et al.; "Properties of crosslinked polyolefin-based materials", Progress in Polymer Science, 1995, vol. 20, No. 6, pp. 1166-1179.

* cited by examiner

HYDROCARBON WELLS INCLUDING CROSSLINKED POLYMER GRANULES AS LOST CIRCULATION MATERIAL AND METHODS OF DRILLING THE HYDROCARBON WELLS

CROSS-REFERENCE TO RELATED APPLICATIONS

This application claims the benefit of U.S. Provisional Application 62/888,214 filed Aug. 16, 2019 entitled "Crosslinked Granular Polyethylene", and also claims the benefit of U.S. Provisional Application 62/890,186 filed Aug. 22, 2019 entitled "Granular Crosslinked Polyethylene as a Loss Circulation Material in a Wellbore Operation Fluid" the entireties of which are incorporated by reference herein. This application claims the benefit of U.S. Provisional Application 62/944,106, filed Dec. 5, 2019 entitled "Highly Crosslinked Polymer Particulate" and also claims the benefit of U.S. Provisional Application 62/951,746, filed Dec. 20, 2020 entitled "Hydrocarbon Wells Including Crosslinked Polymer Granules as Lost Circulation Material and Methods of Drilling the Hydrocarbon Wells" the entireties of which are incorporated by reference herein. This application is also related to U.S. Provisional Application 62/888,221 filed Aug. 16, 2019 entitled "Method of Manufacturing Crosslinked Granular Polyethylene", the entirety of which is incorporated by reference herein. This application is also related to U.S. Provisional Application 62/890,188 filed Aug. 22, 2019 entitled "Granular Crosslinked Polyethylene as a Density Modifier in a Wellbore Operation Fluid Mixture", the entirety of which is incorporated by reference herein. This application is also related to U.S. Provisional Application 62/890,185 filed Aug. 22, 2019 entitled "Granular Crosslinked Polyethylene as a Hydraulic Fracturing Proppant", the entirety of which is incorporated by reference herein. This application is also related to U.S. Provisional Application 62/904,993 filed Sep. 24, 2019 entitled "Granular Crosslinked Polyethylene as a Density Modifier in a Wellbore Operation Fluid Mixture", the entirety of which is incorporated by reference herein. This application is also related to U.S. Provisional Application 62/943,978, filed Dec. 5, 2019 entitled "Methods of Manufacturing Highly Crosslinked Polymer Particulate."

This application is also related to U.S. Provisional Application 62/949,302, filed Dec. 17, 2019 entitled "Highly Crosslinked Polymer Particulate and Methods of Manufacturing Highly Crosslinked Polymer Particulate."

FIELD OF THE DISCLOSURE

The present disclosure relates generally to hydrocarbon wells and/or to methods of drilling the hydrocarbon wells and more particularly to hydrocarbon wells and/or methods that utilize crosslinked polymer granules as a lost circulation material.

BACKGROUND OF THE DISCLOSURE

During formation and/or drilling of a wellbore of a hydrocarbon well, a drill bit may be positioned at a terminal end of the wellbore and rotated to extend a length of the wellbore. In addition, a drilling mud stream, which includes drilling mud, may be utilized to lubricate the drill bit and/or to cool the drill bit. The drilling mud stream also may entrain cuttings, which may be generated during the drilling process. The entrained cuttings may flow from the wellbore and/or into a surface region within a return stream. Under certain conditions, a leakage pathway may extend from the wellbore and/or may permit a fraction of the drilling mud to flow from the wellbore, thus decreasing a flow rate of the return stream. This may decrease an overall efficiency of the drilling process and/or may decrease a rate at which the cuttings are removed from the wellbore. A lost circulation material may be provided to the wellbore to restrict fluid flow through the leakage pathway and/or to decrease loss of the drilling mud via the leakage pathway. To be effective, the lost circulation material must be mechanically and thermally stable and thus able to resist the high temperatures and/or pressures that may be present within the wellbore during the drilling operation. While conventional lost circulation materials are effective in certain circumstances, they are ineffective in others. Thus, there exists a need for hydrocarbon wells including improved lost circulation material and/or for methods of drilling the hydrocarbon wells.

SUMMARY OF THE DISCLOSURE

Hydrocarbon wells including crosslinked polymer granules as lost circulation material and methods of drilling the hydrocarbon wells are disclosed herein. The hydrocarbon wells include a wellbore and a drilling rig. The wellbore extends within a subsurface region, and the drilling rig may include a drill string that may include a drill bit. The drill bit may be positioned within a downhole end region of the wellbore. The hydrocarbon wells also include a drilling mud supply system. The drilling mud supply system may be configured to provide a drilling mud stream to the downhole end region of the wellbore, such as at a drilling mud stream pressure and/or at a drilling mud stream flow rate. The hydrocarbon wells also include a lost circulation detection structure. The lost circulation detection structure may be configured to detect a lost circulation event within the wellbore.

The hydrocarbon wells further include a lost circulation material supply system that includes a lost circulation material. The lost circulation material supply system may be configured to selectively provide the lost circulation material to the wellbore responsive to detection of the lost circulation event by the lost circulation detection structure. The lost circulation material may include a plurality of crosslinked polymer granules, and a characteristic dimension of each crosslinked polymer granule is at least 20 micrometers and at most 1 millimeter. Each crosslinked polymer granule may contain a highly crosslinked polymeric material that includes a plurality of polyethylene polymer chains and a plurality of chemical crosslinks. The plurality of chemical crosslinks may include chemical crosslinks that covalently bond a given polyethylene polymer chain of the plurality of polyethylene polymer chains to another polyethylene polymer chain of the plurality of polyethylene polymer chains.

The methods include rotating a drill string to extend a length of a wellbore and, during the rotating, flowing a drilling mud stream. The methods also include detecting a lost circulation event and, responsive to the detecting, providing a lost circulation material to the wellbore.

DETAILED DESCRIPTION AND BEST MODE OF THE DISCLOSURE

Figure 1:
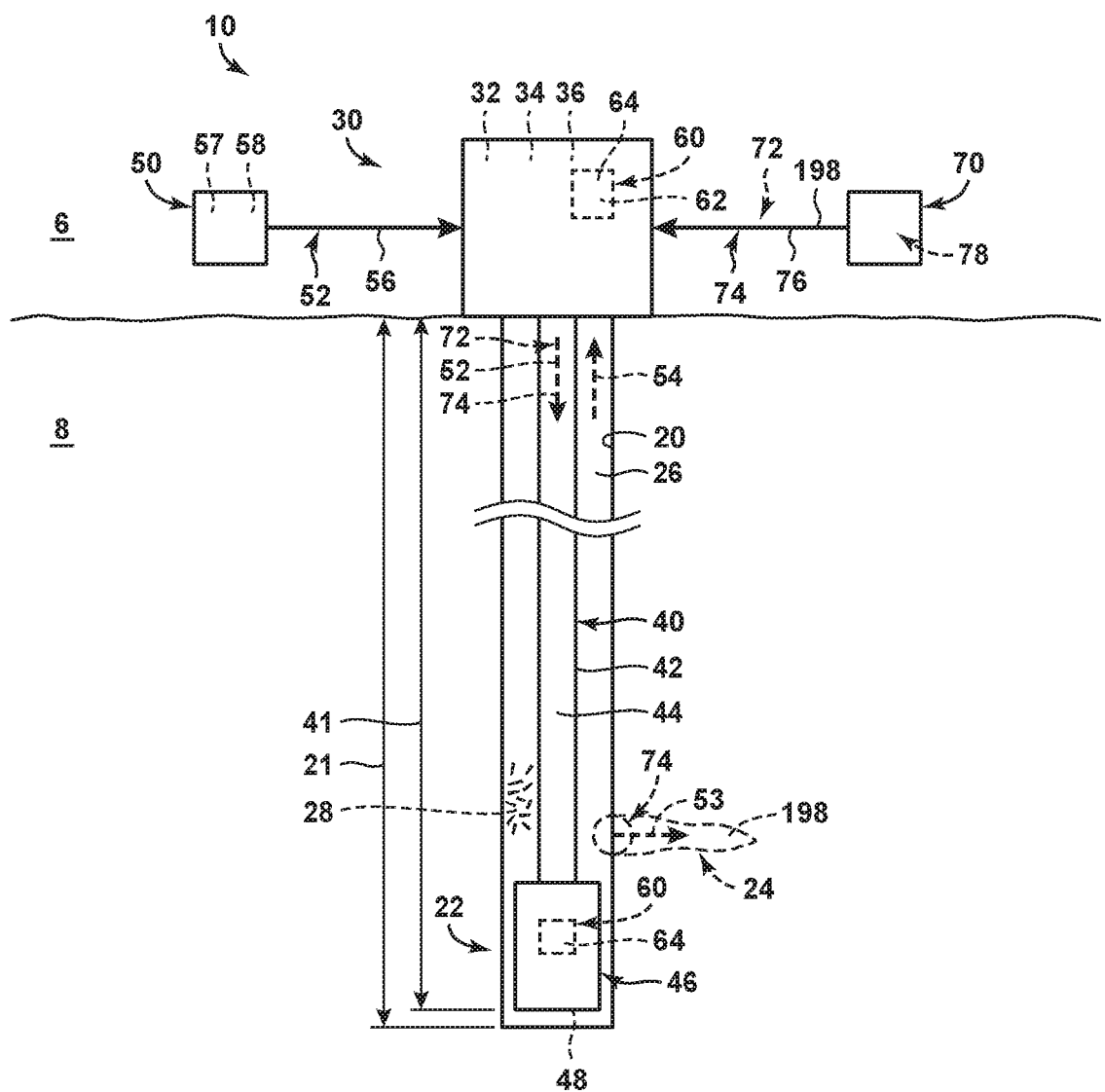
FIG. 1 is a schematic illustration of examples of hydrocarbon wells according to the present disclosure.
Figure 2:
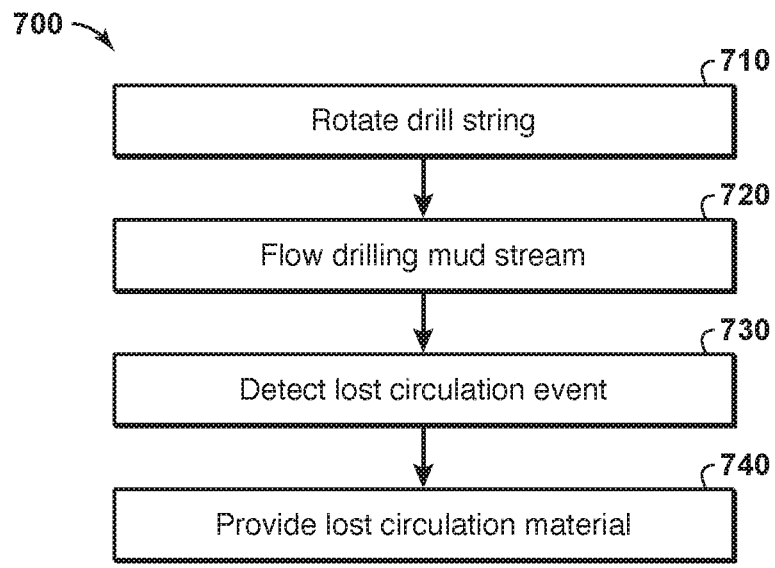
FIG. 2 is a flowchart depicting examples of methods of drilling a hydrocarbon well, according to the present disclosure.
Figure 3:
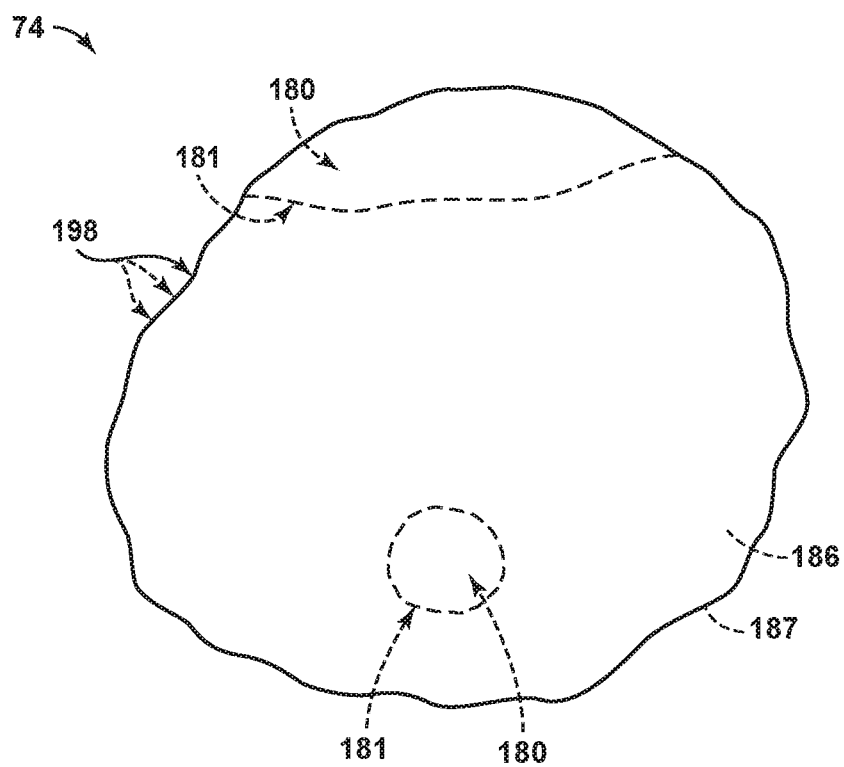
FIG. 3 is a schematic illustration of examples of lost circulation material according to the present disclosure.

FIGS. 1-3 provide examples of hydrocarbon wells 10 and/or of methods 700 that include and/or utilize lost circulation material 74 that includes crosslinked polymer granules 198, according to the present disclosure. Elements that serve a similar, or at least substantially similar, purpose are labeled with like numbers in each of FIGS. 1-3, and these elements may not be discussed in detail herein with reference to each of FIGS. 1-3. Similarly, all elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic illustration of examples of hydrocarbon wells 10 according to the present disclosure. Hydrocarbon wells 10 include a wellbore 20 that extends within a subsurface region 8. Wellbore 20 also may be referred to herein as extending from a surface region 6 and/or as extending between the surface region and the subsurface region. Hydrocarbon wells 10 also include a drilling rig 30. Drilling rig 30 includes a drill string 40 that includes a drill bit 46, which may be positioned within a downhole end region 22 of the wellbore. Hydrocarbon wells 10 further include a drilling mud supply system 50, a lost circulation detection structure 60, and a lost circulation material supply system 70.

During operation and/or drilling of hydrocarbon wells 10 in what may be referred to herein as a drilling operation of the hydrocarbon well, and as discussed in more detail herein with reference to methods 700 of FIG. 2, drill bit 46 may be rotated within wellbore 20, such as to increase a length 21 of the wellbore. Also during the drilling operation, drilling mud supply system 50 may provide a drilling mud stream 52, which includes drilling mud 56, to downhole end region 22. The drilling mud stream may be provided to the downhole end region at a drilling mud stream pressure and/or at a drilling mud stream flow rate. Rotation of drill bit 46 may produce and/or generate cuttings 28, which may be entrained within drilling mud stream 52. The drilling mud stream and entrained cuttings then may flow toward surface region 6 in what may be referred to herein as a return stream 54.

In addition, lost circulation detection structure 60 may be configured to detect a lost circulation event within wellbore 20. As an example, and as discussed in more detail herein, a fraction 53 of drilling mud stream 52 may flow from wellbore 20 via a leakage path 24 that extends from the wellbore and/or within the subsurface region. This loss of the fraction of the drilling mud stream into the subsurface region may cause the lost circulation detection structure to indicate and/or to detect the lost circulation event.

Lost circulation material supply system 70 may include a lost circulation material 74; and, responsive to detection of the lost circulation event by lost circulation detection structure 60, the lost circulation material supply system may be configured to selectively provide the lost circulation material to wellbore 20. Lost circulation material 74 then may flow into, be positioned within, and/or deposit within leakage path 24, thereby restricting and/or blocking flow of the fraction of the drilling mud stream from the wellbore via the leakage path.

As discussed in more detail herein, lost circulation material 74 includes a plurality of crosslinked polymer granules 198. Each crosslinked polymer granule may include a highly crosslinked polymeric material that includes a plurality of polyethylene polymer chains and a plurality of chemical crosslinks. The plurality of chemical crosslinks may include chemical crosslinks that covalently bond a given polyethylene polymer chain to another polyethylene polymer chain. In some examples, a characteristic dimension of each crosslinked polymer granule may be at least 20 micrometers and at most 1 millimeter.

Lost circulation material 74 that includes crosslinked polymer granules 198 may provide benefits over conventional lost circulation materials, examples of which are disclosed herein. As an example, and as discussed herein, a granule density of the crosslinked polymer granules may be selectively tailored, varied, and/or selected to provide a desired density of the plurality of crosslinked polymer granules relative to the drilling mud. This may include selective utilization of crosslinked polymer granules 198 that are positively buoyant, neutrally buoyant, at least substantially neutrally buoyant, and/or negatively buoyant within the drilling mud. Each of these buoyance differences, or the lack thereof, may provide distinct benefits in terms of ease in supply of the lost circulation material to the wellbore and/or effectiveness of the lost circulation material at restricting fluid flow through the leakage pathway.

As a more specific example, pumping costs for the lost circulation material may be significantly reduced, relative to conventional lost circulation materials, by utilizing lost circulation materials that are neutrally and/or positively buoyant within the drilling mud. As another more specific example, lost circulation materials that are negatively buoyant within the drilling mud may be more effective at reaching and/or flowing into leakage paths that are proximate and/or within downhole end region 22. As another more specific example, lost circulation materials that are positively buoyant within the drilling mud may be more effective at reaching and/or flowing into leakage paths that are uphole from the downhole end region and/or may be less likely to collect and/or settle within the wellbore.

Lost circulation material supply system 70 may include any suitable structure that may include and/or contain lost circulation material 74 and/or that may be adapted, configured, designed, and/or constructed to provide, or to selectively provide, the lost circulation material to wellbore 20. As an example, the lost circulation material supply system may include a lost circulation material storage tank 78, which may be configured to contain a volume of the lost circulation material. In some examples, the lost circulation material supply system may be configured to selectively provide a lost circulation material slurry 72, which includes lost circulation material 74 and a liquid 76, to the wellbore. In some examples, the lost circulation material supply system may be configured to selectively provide the lost circulation material to, or directly to, downhole end region 22 of wellbore 20, such as via a pipe conduit 44 of a drill pipe 42 of drill string 40. In some examples, lost circulation material supply system 70 may be configured to selectively inject lost circulation material 74 and/or lost circulation material slurry 72 into drilling mud stream 52. In such a configuration, the lost circulation material may flow, in and/or within the drilling mud stream, into wellbore 20 and/or to downhole end region 22.

As discussed, lost circulation material 74 includes a plurality of crosslinked polymer granules 198. Examples of crosslinked polymer granules 198 are discussed in more detail herein with reference to FIG. 3.

As also discussed, lost circulation material 74, or at least crosslinked polymer granules 198 thereof, may be positively buoyant, neutrally buoyant, and/or negatively buoyant within drilling mud stream 52 and/or within drilling mud 56 thereof. Additionally or alternatively, and depending upon the specific configuration of hydrocarbon well 10, the lost circulation material and/or the crosslinked polymer granules may be positively buoyant, neutrally buoyant, and/or negatively buoyant within liquid 76 of lost circulation material slurry 72.

In some examples, the plurality of crosslinked polymer granules 198 may include a positively buoyant fraction and a negatively buoyant fraction. The positively buoyant fraction of the plurality of crosslinked polymer granules may be positively buoyant within the drilling mud and/or within the liquid, and the negatively buoyant fraction of the plurality of crosslinked polymer granules may be negatively buoyant within the drilling mud and/or within the liquid. Such a configuration may permit, facilitate, and/or encourage segregation of the positively buoyant fraction and the negatively buoyant fraction within different regions of the wellbore, within different leakage paths 24, and/or within different regions of a given leakage path 24.

The granule density of the plurality of crosslinked polymer granules may be within a threshold density range of a mud density of the drilling mud and/or to a liquid density of the liquid. As examples, the granule density may be at least 50%, at least 60%, at least 70%, at least 80%, at least 90%, at least 95%, at least 99%, at least 100%, at least 101%, at least 105%, at least 110%, at most 150%, at most 140%, at most 130%, at most 120%, at most 110%, at most 105%, at most 101%, at most 100%, at most 99%, at most 95%, and/or at most 90% of the mud density and/or of the liquid density.

It is within the scope of the present disclosure that lost circulation material 74 may, in addition to crosslinked polymer granules 198, include one or more other, or additional, materials. As an example, lost circulation material 74 may include a conventional lost circulation material. Examples of the conventional lost circulation material include a fibrous material, a naturally occurring material, bark, shredded cane stalks, mineral fiber, a flake, mica flakes, ground limestone, ground marble, ground wood, ground nut hulls, ground corn cobs, and/or ground cotton hulls. The conventional lost circulation material, when present, may define a plurality of conventional lost circulation material granules that may be separate and/or distinct from crosslinked polymer granules 198. Additionally or alternatively, the conventional lost circulation material may be incorporated into and/or operatively attached to crosslinked polymer granules 198.

Lost circulation detection structure 60 may include any suitable structure that may be adapted, configured, designed, constructed, and/or programmed to detect the lost circulation event within wellbore 20. As an example, lost circulation detection structure 60 may include a drilling mud flow rate detector 62. Drilling mud flow rate detector 62, when present, may be configured to detect the drilling mud stream flow rate of drilling mud stream 52, to detect a return stream flow rate of return stream 54, and/or to detect a flow rate difference between the drilling mud stream flow rate and the return stream flow rate. Examples of drilling mud flow rate detector 62 include at least one differential pressure flow meter, such as a pitot tube flow meter and/or a venturi meter, at least one positive displacement flow meter, such as a rotary vane flow meter, at least one velocity flow meter, such as a turbine flow meter, and/or at least one mass flow meter, such as a thermal dispersion flow meter. In such an example, the lost circulation detection structure may detect, or indicate, the lost circulation event when the flow rate difference between the drilling mud stream flow rate and the return stream flow rate is greater than a threshold flow rate difference. Examples of the threshold flow rate difference include flow rate differences of greater than 2 cubic meters per hour, greater than 4 cubic meters per hour, greater than 6 cubic meters per hour, greater than 8 cubic meters per hour, greater than 10 cubic meters per hour, greater than 15 cubic meters per hour, or greater than 20 cubic meters per hour.

As another example, lost circulation detection structure 60 may include at least one pressure detector 64. The at least one pressure detector, when present, may be configured to detect a pressure of drilling mud stream 52, a pressure of return stream 54, a pressure of drilling mud 56 within wellbore 20, and/or a pressure of the drilling mud within downhole end region 22 of the wellbore. In such an example, the lost circulation detection structure may detect, or indicate, the lost circulation event when the detected pressure is less than a threshold pressure and/or when the detected pressure decreases from a nominal pressure by greater than a threshold pressure decrease. Examples of the threshold pressure decrease include pressure decreases of greater than 5%, greater than 10%, greater than 15%, greater than 20%, greater than 30%, greater than 40%, or greater than 50%.

Drill string 40 may include any suitable structure that includes drill bit 46, that operatively supports drill bit 46 within wellbore 20, and/or that permits and/or facilitates rotation of the drill bit within the wellbore. As an example, drill string 40 may include drill pipe 42 that defines pipe conduit 44. Drill pipe 42 and/or pipe conduit 44 may extend between, or at least partially between, drill bit 46 and surface region 6, drilling mud supply system 50, and/or lost circulation material supply system 70. Additionally or alternatively, pipe conduit 44 may extend to a terminal end 48 of drill string 40.

With this in mind, pipe conduit 44 may, or may be utilized to, provide drilling mud stream 52 to downhole end region 22 of wellbore 20 and/or drilling mud supply system 50 may be configured to provide the drilling mud stream to the wellbore via the pipe conduit. Additionally or alternatively, pipe conduit 44 may, or may be utilized to, provide lost circulation material 74 to downhole end region 22 of wellbore 20 and/or lost circulation material supply system 70 may be configured to provide the lost circulation material to the wellbore via the pipe conduit. In such a configuration, return stream 54 may flow from wellbore 20 and/or to surface region 6 via an annular space 26 that is defined between the wellbore and drill pipe 42. Stated another way, the return stream may be produced from the hydrocarbon well, such as via annular space 26.

As illustrated in dashed lines in FIG. 1, drilling rig 30 may include a top drive 32. Top drive 32, when present, may be configured to selectively rotate drill bit 46 within wellbore 20, such as to extend length 21 of the wellbore. This may include indirect rotation of the drill bit by the top drive, such as via rotation of drill pipe 42. Examples of the top drive include a motor, an electric motor, a hydraulic motor, and/or an internal combustion engine configured to generate a motive force that may be utilized to rotate the drill bit.

As also illustrated in dashed lines in FIG. 1, drilling rig 30 may include a derrick 34. Derrick, when present, may be configured to operatively support drill string 40 within wellbore 20.

Examples of the derrick include a framework, a scaffolding, and/or a crane configured to operatively support the drill string.

As also illustrated in dashed lines in FIG. 1, drilling rig 30 may include a drawworks 36. Drawworks 36, when present, may be configured to selectively control, regulate, and/or vary a length 41 of drill string 40 that extends within wellbore 20 and/or that extends in, within, and/or into subsurface region 8. Examples of the drawworks include a cable, a drum, a winch, and/or a hoist.

Drilling mud supply system 50 may include any suitable structure that may be adapted, configured, designed, and/or constructed to provide, or to selectively provide, drilling mud stream 52 to downhole end region 22 of wellbore 20, to provide the drilling mud stream at the drilling mud stream flow rate, and/or to provide the drilling mud stream at the drilling mud stream pressure. As an example, drilling mud supply system 50 may include a drilling mud tank 57. Drilling mud tank 57, when present, may be configured to house, to contain, and/or to hold a volume of drilling mud 56.

As another example, drilling mud supply system 50 may include a drilling mud pump 58. Drilling mud pump 58, when present, may be configured to pressurize the drilling mud to the drilling mud stream pressure and/or to provide, or to pump, the drilling mud stream at the drilling mud stream flow rate. Examples of drilling mud pump 58 include a positive displacement pump and a dynamic pump.

FIG. 2 is a flowchart depicting examples of methods 700 of drilling a hydrocarbon well, according to the present disclosure. Methods 700 include rotating a drill string at 710 and flowing a drilling mud stream at 720. Methods 700 also include detecting a lost circulation event at 730 and providing a lost circulation material at 740.

Rotating the drill string at 710 may include rotating the drill string, which may form a portion of a drilling rig, within a wellbore of the hydrocarbon well, such as to extend a length of the wellbore. The drill string may include a drill bit, and the rotating at 710 may include rotating the drill bit. The rotating at 710 may be accomplished in any suitable manner. As an example, the rotating at 710 may include rotating with, via, and/or utilizing a top drive of the drilling rig. Examples of the top drive are disclosed herein with reference to top drive 32 of FIG. 1. Examples of the drill string are disclosed herein with reference to drill string 40 of FIG. 1. Examples of the drilling rig are disclosed herein with reference to drilling rig 30 of FIG. 1.

Flowing the drilling mud stream at 720 may include flowing the drilling mud stream to and/or into a downhole end region of the wellbore. This may include flowing the drilling mud stream at a drilling mud stream pressure and/or at a drilling mud stream flow rate. The flowing at 720 may be performed with, via, and/or utilizing a drilling mud supply system, such as drilling mud supply system 50 of FIG. 1. In some examples, and as discussed herein, the flowing at 720 may include flowing the drilling mud stream within a drill pipe of the drill string, or within a pipe conduit of the drill pipe, to the downhole end region of the wellbore.

The flowing at 720 may be performed with any suitable timing and/or sequence during methods 700. As examples, the flowing at 720 may be performed during, concurrently with, and/or at least partially concurrently with, the rotating at 710, the detecting at 730, and/or the providing at 740.

Detecting the lost circulation event at 730 may include detecting the lost circulation event within the wellbore. This may include detecting with, via, and/or utilizing a lost circulation detection structure, such as lost circulation detection structure 60 of FIG. 1. The detecting at 730 may include detecting any suitable property and/or parameter that is indicative of the lost circulation event. As an example, the detecting at 730 may include detecting that a flow rate difference between the drilling mud stream flow rate and a return stream flow rate of a return stream, which includes drilling mud and is produced from the hydrocarbon well during the flowing, is greater than a threshold flow rate difference. As another example, the detecting at 730 may include detecting that a pressure associated with the drilling mud stream is outside a predetermined drilling mud pressure range. As another example, the detecting at 730 may include detecting that a pressure associated with the return stream is outside a predetermined return stream pressure range.

The detecting at 730 may be performed with any suitable timing and/or sequence during methods 700. As examples, the detecting at 730 may be performed during, concurrently with, and/or at least partially concurrently with the rotating at 710, the flowing at 720, and/or the providing at 740.

Providing the lost circulation material at 740 may include providing the lost circulation material to the wellbore. The lost circulation material includes a plurality of crosslinked polymer granules, examples of which are disclosed herein with reference to crosslinked polymer granules 198 of FIGS. 1 and 3. The providing at 740 may be accomplished in any suitable manner. As an example, the providing at 740 may include providing a lost circulation material slurry, which includes the lost circulation material and a liquid, to the wellbore. As another example, the providing at 740 may include providing the lost circulation material to the downhole end region of the wellbore. As yet another example, the providing at 740 may include injecting the lost circulation material into the drilling mud stream, such as during the flowing at 720, to provide the lost circulation material to the wellbore.

The providing at 740 may be performed with any suitable timing and/or sequence during methods 700. As examples, the providing at 740 may be performed during, concurrently with, and/or at least partially concurrently with the rotating at 710 and/or the flowing at 720. As another example, the providing at 740 may be performed responsive to and/or based, at least in part, on the detecting at 730.

FIG. 3 is a schematic illustration of examples of lost circulation material 74, in the form of crosslinked polymer granules 198, according to the present disclosure. Lost circulation material 74 of FIG. 3 may include and/or be a more detailed illustration of lost circulation material 74 illustrated in FIG. 1 and/or of the lost circulation material discussed herein with reference to method 700 of FIG. 2. With this in mind, any of the structures, functions, and/or features of lost circulation material 74 that are discussed herein with reference to FIG. 3 may be included in and/or utilized with the lost circulation material of FIGS. 1-2 without departing from the scope of the present disclosure. Similarly, any of the structures, functions, and/or features that are discussed herein with reference to the lost circulation material of FIGS. 1-2 may be included in and/or utilized with lost circulation material 74 of FIG. 3 without departing from the scope of the present disclosure.

As illustrated in FIG. 3, crosslinked polymer granules 198 each contain, or each crosslinked polymer granule of the plurality of crosslinked polymer granules contains, a polymeric material 186, which also may be referred to herein as a crosslinked polymeric material 186 and/or as a highly crosslinked polymeric material 186. The highly crosslinked polymeric material 186 includes a plurality of polyethylene polymer chains and a plurality of chemical crosslinks. The plurality of chemical crosslinks includes chemical crosslinks that covalently bond a given polyethylene polymer chain of the plurality of polyethylene polymer chains to another polyethylene polymer chain of the plurality of polyethylene polymer chains.

In some examples, the plurality of polyethylene polymer chains may include a plurality of linear polyethylene polymer chains. In some examples, each polyethylene polymer chain of the plurality of polyethylene polymer chains includes a plurality of methylene repeat units and/or a plurality of ethylene repeat units covalently bonded to one another to form a plurality of carbon-carbon bonds.

In some examples, at least a subset of the plurality of polyethylene polymer chains includes a branched polymer chain. The branched polymer chain may include at least one branch group, which may extend from a polymer backbone of the branched polymer chain. In some such examples, a given chemical crosslink of the plurality of chemical crosslinks may extend from the at least one branch group.

The at least one branch group, when present, may include any suitable number of carbon atoms and/or may have any suitable length. As examples, the at least one branch group may include at least 10, at least 25, at least 50, at least 100, at least 500, at least 1,000, at least 5,000, at least 10,000, at least 25,000, and/or at least 50,000 carbon atoms. The carbon atoms that form the at least one branch group may be arranged linearly, such as along a branch group backbone of the at least one branch group. Alternatively, the carbon atoms that form the at least one branch group may, themselves, form sub-branches. Stated another way, the at least one branch group may, itself, be branched.

In some examples, at least a subset of the plurality of polyethylene polymer chains includes a pendant group that extends from the polymer backbone of the subset of the plurality of polyethylene polymer chains. In some such examples, a given chemical crosslink of the plurality of chemical crosslinks may extend from the pendant group. The pendant group, when present, may include any suitable number of carbon atoms. As examples, the pendant group may include at least 1, at least 2, at least 3, at least 4, at least 5, at least 6, at least 7, at least 8, at least 10, at least 15, at least 20, at most 50, at most 40, at most 30, at most 20, at most 15, at most 12, at most 10, at most 8, and/or at most 6 carbon atoms.

The pendant group may have and/or define any suitable structure, including linear structures, branched structures, cyclic structures, and/or combinations thereof. A specific example of the pendant group includes pendant groups that may decrease, or limit, a degree of crosslinking of the plurality of crosslinked polymer granules, such as via increasing a minimum distance between adjacent polyethylene polymer chains and/or by making it difficult for the polymer backbones of adjacent polyethylene polymer chains to closely pack. Examples of such pendant groups include a methyl group, an ethyl group, a propyl group, a butyl group, a pentyl group, a hexyl group, a heptyl group, an octyl group, a nonyl group, and/or a decyl group.

In some examples, and prior to formation of the plurality of chemical crosslinks, the pendant group may include a ring, a cyclic structure, and/or a double bond, which may permit and/or facilitate formation of a corresponding chemical crosslink. Examples of such pendant groups include a cyclic hydrocarbon, a bridged cyclic hydrocarbon, a norbornene-derived pendant group, an ethylidene-derived pendant group, and/or a vinyl norbornene-derived pendant group.

The plurality of polyethylene polymer chains may be highly crosslinked via the plurality of chemical crosslinks. The plurality of polyethylene polymer chains may have and/or define any suitable degree of crosslinking, or average degree of crosslinking. Examples of the average degree of crosslinking include at least 0.01%, at least 0.1%, at least 1%, at least 2%, at least 3%, at least 4%, at least 5%, at least 6%, at least 8%, at least 10%, at least 12%, at least 14%, at least 16%, at least 18%, at least 20%, at least 25%, at least 30%, at least 35%, at least 40%, at least 45%, and/or at least 50%. In some examples, the highly crosslinked polymeric material within a given crosslinked polymer granule may be so highly crosslinked that the given crosslinked polymer granule may be defined by, at least substantially entirely by, or even entirely by a single polymeric molecule.

As used herein, the phrase "degree of crosslinking" may refer to a mole percentage, or an average mole percentage, of repeat units within a given polyethylene polymer chain that are crosslinked to another polyethylene polymer chain. For example, a polyethylene polymer chain with 100 repeat units and one crosslink would exhibit a "degree of crosslinking" of 1/100=1%. Similarly, a polyethylene polymer chain with 100 repeat units and 10 crosslinks would exhibit a "degree of crosslinking" of 10/100=10%.

Each chemical crosslink may extend from any suitable portion of a given polyethylene polymer chain to any suitable portion of another polyethylene polymer chain. For example, a chemical crosslink may extend from an ethylene repeat unit of a given polyethylene polymer chain to an ethylene repeat unit of another polyethylene polymer chain to form a covalent bond therebetween. As another example, for examples in which at least a subset of the plurality of polyethylene polymer chains includes a pendant group, a chemical crosslink may extend from a portion of a pendant group included in a given polyethylene polymer chain to a pendant group of another polyethylene polymer chain. Alternatively, the chemical crosslink may extend from a polymer backbone of a given polyethylene polymer chain to a pendant group of another polyethylene polymer chain.

In some examples, the plurality of chemical crosslinks may be distributed, evenly distributed, or even homogeneously distributed throughout the plurality of crosslinked polymer granules. Stated another way, and in these examples, the plurality of chemical crosslinks may be distributed throughout the plurality of crosslinked polymer granules.

In some examples, the plurality of chemical crosslinks may be heterogeneously distributed within each crosslinked polymer granule, such as when the plurality of chemical crosslinks is preferentially distributed proximate an external surface of each crosslinked polymer granule. Stated another way, each crosslinked polymer granule may include an external shell that exhibits a higher degree of crosslinking relative to a remainder of the crosslinked polymer granule.

The plurality of crosslinked polymer granules may have and/or define any suitable structure. As examples, the plurality of crosslinked polymer granules may include and/or be a plurality of high density polyethylene granules and/or a plurality of crosslinked high density polyethylene granules.

In addition, the plurality of crosslinked polymer granules may have and/or define any suitable shape. As examples, the plurality of crosslinked polymer granules may include a plurality of irregularly shaped crosslinked polymer granules, a plurality of spheroid-shaped crosslinked polymer granules, a plurality of at least partially spherical crosslinked polymer granules, a plurality of spherical crosslinked polymer granules, a plurality of at least partially cylindrical crosslinked polymer granules, a plurality of cylindrical crosslinked polymer granules, and/or a plurality of rod-shaped crosslinked polymer granules. In some examples, the plurality of crosslinked polymer granules may include polyethylene particles produced by a polyethylene reactor and subsequently crosslinked to form the plurality of crosslinked polymer granules.

The plurality of crosslinked polymer granules may include recycled polyethylene. As an example, the plurality of crosslinked polymer granules may include at least a threshold fraction of a post-consumer granular polymeric material. Examples of the threshold fraction of the post-consumer granular polymeric material include 5 weight percent, 10 weight percent, 15 weight percent, 20 weight percent, 25 weight percent, 30 weight percent, 40 weight percent, 50 weight percent, 60 weight percent, 70 weight percent, 80 weight percent, 90 weight percent, 95 weight percent, 99 weight percent, and/or 100 weight percent.

A characteristic dimension of each crosslinked polymer granule is within a threshold characteristic dimension range of at least 10 micrometers and at most 5 millimeters. As more specific examples, a lower limit of the characteristic dimension range may be at least 10 micrometers, at least 15 micrometers, at least 20 micrometers, at least 25 micrometers, at least 30 micrometers, at least 40 micrometers, at least 50 micrometers, at least 75 micrometers, at least 100 micrometers, at least 125 micrometers, at least 150 micrometers, at least 200 micrometers, at least 250 micrometers, at least 300 micrometers, at least 400 micrometers, at least 500 micrometers, at least 600 micrometers, at least 700 micrometers, at least 800 micrometers, at least 900 micrometers, and/or at least 1,000 micrometers. Additionally or alternatively, an upper limit of the characteristic dimension range may be at most 5 millimeters, at most 3.5 millimeters, at most 3 millimeters, at most 2.5 millimeters, at most 2 millimeters, at most 1.5 millimeters, at most 1.25 millimeters, at most 1 millimeter, at most 900 micrometers, at most 800 micrometers, at most 700 micrometers, at most 600 micrometers, at most 500 micrometers, at most 400 micrometers, and/or at most 300 micrometers.

Examples of the characteristic dimension include a maximum extent of each crosslinked polymer granule and/or a diameter of each crosslinked polymer granule. Additional examples of the characteristic dimension include an effective diameter of each crosslinked polymer granule and/or a minimum diameter of a sphere that fully contains each crosslinked polymer granule.

As illustrated in dashed lines in FIG. 3, the plurality of crosslinked polymer granules 198 may contain a property-modifying filler 180. The property-modifying filler 180, when present, may be configured to modify at least one property of the plurality of crosslinked polymer granules 198. This property modification may be relative and/or compared to a corresponding crosslinked polymer granule that includes the highly crosslinked polymeric material but that does not include the property-modifying filler. With this in mind, crosslinked polymer granules 198 that include property-modifying filler 180, according to the present disclosure, also may be referred to herein as filled crosslinked polymer granules 198, filled highly crosslinked polymer granules 198, modified highly crosslinked polymer granules 198, and/or property-modified highly crosslinked polymer granules 198. Property-modifying filler 180 additionally or alternatively may be referred to herein as a property-modifying material 180 and/or as property-modifying additive 180.

Property-modifying filler 180 may include any suitable material and/or materials that may modify, that may be configured to modify, and/or that may be selected to modify and/or to selectively modify the at least one property of the plurality of crosslinked polymer granules. Examples of the property-modifying filler include silica, talc, carbon black, a tracer material, a glass fiber, a metal, and/or another polymer (e.g., other than polyethylene). Additional examples of the property-modifying filler include conventional lost circulation material, examples of which are disclosed herein. Examples of the tracer material include a radio frequency identification tag, a chemical tracer material that is chemically distinct from a remainder of the crosslinked polymer granules, and/or a radioactive tracer material.

In some examples, the property-modifying filler may be distributed, may be uniformly distributed, and/or may be homogeneously distributed in and/or within each crosslinked polymer granule 198. In some examples, each crosslinked polymer granule 198 may include at least one property-modifying filler domain 181 and at least one highly crosslinked polymeric material domain 187. In some such examples, the at least one property-modifying filler domain and the at least one highly crosslinked polymeric material domain may be adhered to one another to form and/or define a corresponding crosslinked polymer granule. In some examples, the at least one highly crosslinked polymeric material domain may surround and/or encapsulate the at least one property-modifying filler domain. In some examples, the at least one property-modifying filler domain may surround and/or encapsulate the at least one highly crosslinked polymeric material domain.

It is within the scope of the present disclosure that the property-modifying filler may modify the at least one property of the plurality of crosslinked polymer granules. As an example, a composition of the property-modifying filler may be selected such that the at least one property of the plurality of crosslinked polymer granules is within a desired property range and/or such that the at least one property of the plurality of crosslinked polymer granules is greater or less than a corresponding property of the highly crosslinked polymeric material. As another example, a weight percentage of the property-modifying filler within the plurality of crosslinked polymer granules may be selected such that the at least one property of the plurality of crosslinked polymer granules is within the desired property range, such that the at least one property of the plurality of crosslinked polymer granules is greater than the corresponding property of the highly crosslinked polymeric material, or such that the at least one property of the plurality of crosslinked polymer granules is less than the corresponding property of the highly crosslinked polymeric material.

The at least one property of the plurality of crosslinked polymer granules may include and/or be any suitable, desired, and/or selected property of the plurality of crosslinked polymer granules. As examples, the at least one property of the plurality of crosslinked polymer granules may include one or more of a thermal stability of the plurality of crosslinked polymer granules, a glass transition temperature of the plurality of crosslinked polymer granules, a mechanical hardness of the plurality of crosslinked polymer granules, a mechanical strength of the plurality of crosslinked polymer granules, a Young's Modulus of the plurality of crosslinked polymer granules, a resistance to oil absorption of the plurality of crosslinked polymer granules, a traceability of detectability of the plurality of crosslinked polymer granules, a magnetic property of the plurality of crosslinked polymer granules, a chemical property of the plurality of crosslinked polymer granules, an electrical property of the plurality of crosslinked polymer granules, and/or a chemical reactivity of the plurality of crosslinked polymer granules. In such examples, the corresponding property of the highly crosslinked polymeric material may include and/or be a thermal stability of the highly crosslinked polymeric material, a glass transition temperature of the highly crosslinked polymeric material, a mechanical hardness of the highly crosslinked polymeric material, a mechanical strength of the highly crosslinked polymeric material, a Young's Modulus of the highly crosslinked polymeric material, a resistance to oil absorption of the highly crosslinked polymeric material, a traceability of detectability of the highly crosslinked polymeric material, a magnetic property of the highly crosslinked polymeric material, a chemical property of the highly crosslinked polymeric material, an electrical property of the highly crosslinked polymeric material, and/or a chemical reactivity of the highly crosslinked polymeric material.

As a more specific example, the at least one property of the plurality of crosslinked polymer granules may include and/or be a density of the plurality of crosslinked polymer granules. As an example, a composition of the property-modifying filler and/or a weight percentage of the property-modifying filler within the plurality of crosslinked polymer granules may be selected such that the density of the plurality of crosslinked polymer granules is within a desired density range. In some examples, the desired density range may be greater than a polymeric material density of the highly crosslinked polymeric material. Stated another way, a filler density of the property-modifying filler may be greater than the polymeric material density. In some examples, the desired density range may be less than the polymeric material density of the highly crosslinked polymeric material. Stated another way, the filler density may be less than the polymeric material density of the highly crosslinked polymeric material.

Examples of a lower bound, or limit, on the desired density range include a lower bound of at least 0.7 grams per cubic centimeter (g/cc), at least 0.75 g/cc, at least 0.8 g/cc, at least 0.85 g/cc, at least 0.9 g/cc, at least 0.95 g/cc, at least 1.0 g/cc, at least 1.05 g/cc, at least 1.25 g/cc, at least 1.5 g/cc, at least 2 g/cc, at least 2.5 g/cc, and/or at least 3 g/cc. Examples of an upper bound, or limit, on the desired density range include an upper bound of at most 6 g/cc, at most 5 g/cc, at most 4 g/cc, at most 3 g/cc, at most 2.0 g/cc, at most 1.9 g/cc, at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, at most 1.0 g/cc, and/or at most 0.95 g/cc.

Examples of the polymeric material density include polymeric material densities of at least 0.85 g/cc, at least 0.86 g/cc, at least 0.87 g/cc, at least 0.88 g/cc, at least 0.89 g/cc, at least 0.9 g/cc, at least 0.91 g/cc, at least 0.92 g/cc, at least 0.93 g/cc, at least 0.94 g/cc, at least 0.95 g/cc, at most 0.96 g/cc, at most 0.97 g/cc, and/or at most 0.98 g/cc. Examples of the filler density include filler densities of at least 0.5 g/cc, at least 0.6 g/cc, at least 0.7 g/cc, at least 0.8 g/cc, at most 0.85 g/cc, at most 0.8 g/cc, and/or at most 0.75 g/cc. Additional and/or alternative examples of the filler density include filler densities of at least 2.0 g/cc, at least 2.1 g/cc, at least 2.2 g/cc, at least 2.3 g/cc, at least 2.5 g/cc, at least 3 g/cc, at least 3.5 g/cc, at most 9 g/cc, at most 8 g/cc, at most 7 g/cc, at most 6 g/cc, at most 5 g/cc, at most 4 g/cc, at most 3 g/cc, at most 2.75 g/cc, at most 2.5 g/cc, at most 2.25 g/cc, and/or at most 2 g/cc.

Each crosslinked polymer granule may have and/or define a corresponding granule density. In some examples, the corresponding granule density may be equal, or at least substantially equal, for each, or for every, crosslinked polymer granule. In some examples, a first subset of the plurality of crosslinked polymer granules may have and/or define a first granule density and a second subset of the plurality of crosslinked polymer granules may have and/or define a second granule density, which may differ from the first granule density.

The corresponding granule density of the plurality of crosslinked polymer granules may define, or may be referred to herein as defining, a granule density distribution. The granule density distribution may have and/or define any suitable distribution shape. Examples of the distribution shape include a constant distribution, an at least substantially constant distribution, a single-mode distribution, an at least substantially single-mode distribution, a multi-modal distribution, an at least substantially multi-modal distribution, a bimodal distribution, an at least substantially bimodal distribution, a trimodal distribution, an at least substantially trimodal distribution, a normal distribution, and/or an at least substantially normal distribution.

As used herein, the phrase "highly crosslinked" may be utilized to modify and/or to describe polymeric material and/or polymer granules that are at least partially formed from the polymeric material. Such polymeric material and/or polymer granules, when "highly crosslinked," include polyethylene polymer chains with a degree of crosslinking sufficient to provide the highly crosslinked polymeric material and/or the highly crosslinked polymer granules with one or more of the below-described properties. Stated another way, a degree of crosslinking needed to provide the polymeric material and/or the polymer granules with one or more of the below-described properties indicates that the polymeric material is a highly crosslinked polymeric material and/or that the polymer granules are highly crosslinked polymer granules in the context of the instant disclosure.

As an example, and upon fluid contact with naturally occurring liquid hydrocarbons, such as crude oil, within a hydrocarbon well, the crosslinked polymer granules disclosed herein may undergo less than a threshold increase in mass due to absorption of the naturally occurring liquid hydrocarbons. Examples of the threshold increase in mass include threshold increases of 0.05%, 0.1%, 0.25%, 0.5%, 0.75%, 1%, 2%, 3%, 4%, and/or 5%.

As another example, and upon fluid contact with crude oil for a time period of 8 weeks, at a temperature of 85 degrees Celsius, and under a uniaxial stress of 35 Megapascals, the crosslinked polymer granules disclosed herein undergo at most a threshold increase in strain. Examples of the threshold increase in strain include increases of 1%, 2%, 3%, 4%, 5%, 6%, 8%, and/or 10%.

As yet another example, and when subjected to a confining stress of 42 Megapascals at a temperature of 85 degrees Celsius, a monolayer of the crosslinked polymer granules disclosed herein defines at least a threshold fluid conductivity. Examples of the threshold fluid conductivity include fluid conductivities of $0.5 \times 10^4$ micrometers$^3$, $1.0 \times 10^4$ micrometers$^3$, $1.5 \times 10^4$ micrometers$^3$, $1.75 \times 10^4$ micrometers$^3$, $2 \times 10^4$ micrometers$^3$, $2.25 \times 10^4$ micrometers$^3$, $2.75 \times 10^4$ micrometers$^3$, $3 \times 10^4$ micrometers$^3$, $3.5 \times 10^4$ micrometers$^3$, $4 \times 10^4$ micrometers$^3$, $4.5 \times 10^4$ micrometers$^3$, $5 \times 10^4$ micrometers$^3$, and/or $6 \times 10^4$ micrometers$^3$.

As another example, the crosslinked polymer granules disclosed herein may have at least a threshold onset of melting temperature. Examples of the threshold onset of melting temperature include temperatures of 40 degrees Celsius, 45 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, and/or 110 degrees Celsius.

As yet another example, the crosslinked polymer granules disclosed herein may have at least a threshold melting temperature. Examples of the threshold melting temperature include temperatures of 60 degrees Celsius, 65 degrees Celsius, 70 degrees Celsius, 75 degrees Celsius, 80 degrees Celsius, 85 degrees Celsius, 90 degrees Celsius, 95 degrees Celsius, 100 degrees Celsius, 105 degrees Celsius, 110 degrees Celsius, 115 degrees Celsius, 120 degrees Celsius, 125 degrees Celsius, 130 degrees Celsius, and/or 135 degrees Celsius.

As another example, the crosslinked polymer granules disclosed herein may exhibit less than a threshold strain when subject to a stress of 35 Megapascals at a temperature of 85 degrees Celsius. Examples of the threshold strain include threshold strains of 40%, 39%, 38%, 37%, 36%, 35%, 34%, 33%, 32%, 31%, and/or 30%.

As yet another example, and when compared to analogous uncrosslinked polymer granules, the crosslinked polymer granules disclosed herein may exhibit at least a threshold decrease in strain when subject to a stress of 35 Megapascals at a temperature of 85 degrees Celsius. Examples of the threshold decrease in strain include decreases of 10%, 9%, 8%, 7%, 6%, 5%, 4%, 3%, and/or 2%.

As used herein, the phrase "analogous uncrosslinked polymer granule," when utilized to compare to the crosslinked polymer granules disclosed herein, may include an uncrosslinked polymer granule that has and/or defines an identical chemical structure to that of the crosslinked polymer granules with the exception that the uncrosslinked polymer granule does not include the plurality of chemical crosslinks. Stated another way, a granular polymeric material may be crosslinked to form and/or define the crosslinked polymer granules, and the analogous uncrosslinked polymer granules may refer to the granular polymeric material prior to being crosslinked to form the crosslinked polymer granules.

The highly crosslinked polymeric material and/or the crosslinked polymer granules disclosed herein may, in addition to one or more of the above-described properties, also, or optionally also, exhibit one or more of the below-described properties. As an example, the crosslinked polymer granules may define a granule density. Examples of the granule density include densities of at least 0.8 g/cc, at least 0.82 g/cc, at least 0.84 g/cc, at least 0.86 g/cc, at least 0.88 g/cc, at least 0.9 g/cc, at least 0.92 g/cc, at least 0.94 g/cc, at least 0.96 g/cc, at least 0.98 g/cc, at least 1 g/cc, at most 2.6 g/cc, at most 2.4 g/cc, at most 2.2 g/cc, at most 2 g/cc, at most 1.8 g/cc, at most 1.6 g/cc, at most 1.4 g/cc, at most 1.2 g/cc, at most 1.1 g/cc, at most 1 g/cc, at most 0.99 g/cc, at most 0.98 g/cc, at most 0.97 g/cc, and/or at most 0.96 g/cc.

As another example, and when compared to the analogous uncrosslinked polymer granules, the crosslinked polymer granules may resist fusing when exposed to a compressive force. Stated another way, fusing of the crosslinked polymer granules may be quantitatively less than fusing of the analogous uncrosslinked polymer granules. As examples, fusing of the crosslinked polymer granules may be at least 10% less, at least 20% less, at least 30% less, at least 40% less, at least 50% less, at least 60% less, at least 70% less, at least 80% less, and/or at least 90% less than fusing of the analogous uncrosslinked polymer granules when exposed to the compressive force.

As yet another example, and when compared to the analogous uncrosslinked polymer granules, the crosslinked polymer granules may resist flowing when exposed to the compressive force. Stated another way, the flow of the crosslinked polymer granules may be quantitatively less than the flow of the analogous uncrosslinked polymer granules. As examples, flow of the crosslinked polymer granules may be at least 10% less, at least 20% less, at least 30% less, at least 40% less, at least 50% less, at least 60% less, at least 70% less, at least 80% less, and/or at least 90% less than the flow of the analogous uncrosslinked polymer granules when exposed to the compressive force.

As another example, and when compared to the analogous uncrosslinked polymer granules, the crosslinked polymer granules may maintain fluid permeability when exposed to the compressive force. Stated another way, the fluid permeability of the crosslinked polymer granules may decrease to a lesser extent when compared to fluid permeability of the analogous uncrosslinked polymer granules. As examples, fluid permeability of the crosslinked polymer granules may decrease at least 10% less, at least 20% less, at least 30% less, at least 40% less, at least 50% less, at least 60% less, at least 70% less, at least 80% less, and/or at least 90% less than the fluid permeability of the analogous uncrosslinked polymer granules when exposed to the compressive force.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A hydrocarbon well, comprising:
    a wellbore that extends within a subsurface region;
    a drilling rig including a drill string, wherein the drill string includes a drill bit, and further wherein the drill bit is positioned within a downhole end region of the wellbore;
    a drilling mud supply system configured to provide a drilling mud stream to the downhole end region of the wellbore at a drilling mud stream pressure and a drilling mud stream flow rate;
    a lost circulation detection structure configured to detect a lost circulation event within the wellbore; and
    a lost circulation material supply system that includes a lost circulation material, wherein the lost circulation material supply system is configured to selectively provide the lost circulation material to the wellbore responsive to detection of the lost circulation event by the lost circulation detection structure,
        wherein the lost circulation material includes a plurality of crosslinked polymer granules comprising polyethylene having an average degree of crosslinking of at least 5% and a density of at least 0.9 g/cc, the crosslinked polymer granules undergoing less than 5% increase in mass upon contact with liquid hydrocarbons, wherein a characteristic dimension of each crosslinked polymer granule of the plurality of crosslinked polymer granules is at least 25 micrometers and at most 1 millimeter.

2. The hydrocarbon well of claim 1, wherein a leakage path extends from the wellbore and within the subsurface region, wherein the lost circulation material is positioned, within the leakage path, and wherein the lost circulation material restricts flow of the drilling mud stream from the wellbore via the leakage path.

3. The hydrocarbon well of claim 1, wherein the lost circulation material supply system is configured to selectively provide the lost circulation material to the wellbore via the pipe conduit.

4. The hydrocarbon well of claim 1, wherein the drilling rig further includes at least one of:
  (i) a top drive configured to selectively rotate the drill bit within the wellbore to extend a length of the wellbore;
  (ii) a derrick configured to operatively support the drill string within the wellbore; and
  (iii) a drawworks configured to selectively control a length of the drill string that extends within the subsurface region.

5. The hydrocarbon well of claim 1, wherein the lost circulation detection structure includes a drilling mud flow rate detector configured to detect a flow rate difference between the drilling mud stream flow rate and a return stream flow rate of a return stream that includes drilling mud and is produced from the hydrocarbon well.

6. The hydrocarbon well of claim 1, wherein the lost circulation detection structure includes a pressure detector configured to detect at least one of:
  (i) a pressure of the drilling mud stream;
  (ii) a pressure of a return stream that includes drilling mud and is produced from the hydrocarbon well;
  (iii) a pressure of drilling mud within the wellbore; and
  (iv) a pressure of drilling mud within the downhole end region of the wellbore.

7. The hydrocarbon well of claim 1, wherein the lost circulation material supply system is configured to selectively provide a lost circulation material slurry, which includes the lost circulation material and a liquid, to the wellbore.

8. The hydrocarbon well of claim 1, wherein the lost circulation material supply system is configured to selectively provide the lost circulation material to the downhole end region of the wellbore.

9. The hydrocarbon well of claim 1, wherein the lost circulation material supply system is configured to selectively inject the lost circulation material into the drilling mud stream to provide the lost circulation material to the wellbore.

10. The hydrocarbon well of claim 1, wherein the plurality of crosslinked polymer granules is at least substantially neutrally buoyant within the drilling mud.

11. The hydrocarbon well of claim 1, wherein the plurality of crosslinked polymer granules is positively buoyant within the drilling mud.

12. The hydrocarbon well of claim 1, wherein the plurality of crosslinked polymer granules is negatively buoyant within the drilling mud.

13. The hydrocarbon well of claim 1, wherein a positively buoyant fraction of the plurality of crosslinked polymer granules is positively buoyant within the drilling mud, and further wherein a negatively buoyant fraction of the plurality of crosslinked polymer granules is negatively buoyant within the drilling mud.

14. The hydrocarbon well of claim 1, wherein a granule density of the plurality of crosslinked polymer granules is at least 2 grams per cubic centimeter.

15. The hydrocarbon well of claim 1, wherein a granule density of the plurality of crosslinked polymer granules is at most 4 grams per cubic centimeter.

16. The hydrocarbon well of claim 1, wherein a granule density of the plurality of crosslinked polymer granules is at least 80% and at most 120% of a mud density of the drilling mud.

17. The hydrocarbon well of claim 1, wherein the lost circulation material further includes a conventional lost circulation material.

18. The hydrocarbon well of claim 17, wherein the conventional lost circulation material includes at least one of:
  (i) a fibrous material;
  (ii) a naturally occurring material;
  (iii) bark;
  (iv) shredded cane stalks;
  (v) mineral fiber;
  (vi) a flake;
  (vii) mica flakes;
  (viii) ground limestone;
  (ix) ground marble;
  (x) ground wood;
  (xi) ground nut hulls;
  (xii) ground corn cobs; and
  (xiii) ground cotton hulls.

19. The hydrocarbon well of claim 1, wherein the lost circulation detection structure comprises one or more selected from a pitot tube, venturi meter, rotary vane meter, turbine flow meter, or thermal dispersion flow meter.

20. The hydrocarbon well of claim 1, wherein the crosslinked polymer granules further comprise one or more fillers selected from the group consisting of silica, talc, carbon black, tracer material, and metal.

21. The hydrocarbon well of claim 1, wherein the crosslinked polymer granules under go at most a threshold increase in strain of 10% upon fluid contact with crude oil for a time period of 8 weeks at a temperature of 85 degrees Celsius.

22. The hydrocarbon well of claim 1, wherein the crosslinked polymer granules have a fluid permeability when exposed to compressive force that is at least 10% less than analogous uncrosslinked polymer granules.

23. A method of drilling a hydrocarbon well, the method comprising:
  rotating a drill string of a drilling rig within a wellbore of the hydrocarbon well to extend a length of the wellbore;
  during the rotating, flowing a drilling mud stream to a downhole end region of the wellbore at a drilling mud stream pressure and a drilling mud stream flow rate;
  during the flowing, detecting a lost circulation event within the wellbore; and
  responsive to the detecting, providing lost circulation material to the wellbore, wherein the lost circulation material includes a plurality of crosslinked polymer granules comprising polyethylene having an average degree of crosslinking of at least 5% and a density of at least 0.9 g/cc, the crosslinked polymer granules undergoing less than 5% increase in mass upon contact with liquid hydrocarbons, wherein a characteristic dimension of each crosslinked polymer granule of the plurality of crosslinked polymer granules is at least 25 micrometers and at most 1 millimeter.

24. The method of claim 23, wherein the flowing includes flowing the drilling mud stream within a drill pipe of the drill string and to the downhole end region of the wellbore.

25. The method of claim 23, wherein the detecting includes at least one of:
(i) detecting that a flow rate difference between the drilling mud stream flow rate and a return stream flow rate of a return stream, which includes drilling mud and is produced from the hydrocarbon well during the flowing, is greater than a threshold flow rate difference;
(ii) detecting that a pressure associated with the drilling mud stream is outside a predetermined drilling mud pressure range; and
(iii) detecting that a pressure associated with the return stream is outside a predetermined return stream pressure range.

26. The method of claim 23, wherein the providing the lost circulation material includes at least one of:
(i) providing a lost circulation material slurry, which includes the lost circulation material and a liquid, to the wellbore;
(ii) providing the lost circulation material to the downhole end region of the wellbore; and
(iii) injecting the lost circulation material into the drilling mud stream to provide the lost circulation material to the wellbore.

* * * * *